United States Patent [19]
Gellert

[11] Patent Number: 5,652,003
[45] Date of Patent: Jul. 29, 1997

[54] INJECTION MOLDING NOZZLE WITH RADIAL VANES

[76] Inventor: Jobst Ulrich Gellert, 7A Prince Street, Georgetown, Ontario, Canada, L7G 2X1

[21] Appl. No.: 771,114

[22] Filed: Dec. 20, 1996

Related U.S. Application Data

[63] Continuation of Ser. No. 519,733, Aug. 28, 1995, abandoned.

[30] Foreign Application Priority Data

Jul. 28, 1995 [CA] Canada ................................. 2154969

[51] Int. Cl.6 ................................................ B29C 45/20
[52] U.S. Cl. ........................ 425/549; 264/328.15
[58] Field of Search .................. 425/549; 264/328.15

[56] References Cited

U.S. PATENT DOCUMENTS

| | | |
|---|---|---|
| 4,355,460 | 10/1982 | Gellert . |
| 4,622,001 | 11/1986 | Bright et al. ............................ 425/549 |
| 4,911,636 | 3/1990 | Gellert ................................ 425/549 |
| 4,954,072 | 9/1990 | Zimmerman ......................... 425/549 |
| 5,206,040 | 4/1993 | Gellert . |

*Primary Examiner*—Tim Heitbrink
*Attorney, Agent, or Firm*—Dalesman & Company

[57] ABSTRACT

An integral injection molding nozzle having a highly thermally conductive intermediate portion formed between an inner core portion and an outer shell portion. The inner core portion and outer shell portion are formed of materials having high strength which are wear and corrosion resistant. One of the inner core portion and outer shell portion has a plurality of spaced vanes extending radially across the highly conductive intermediate portion to provide more impact strength.

4 Claims, 4 Drawing Sheets

INJECTION MOLDING NOZZLE WITH RADIAL VANES

This application is a continuation of application Ser. No. 08/519,733, filed on Aug. 28, 1995, now abandoned.

BACKGROUND OF THE INVENTION

This invention relates generally to injection molding and more particularly to a nozzle for hot runner molding which has high strength and does not require a heating element.

A variety of different nozzles seated in the mold with a central melt bore extending therethrough are used to convey melt towards the gate. These nozzles are usually heated, with steel nozzles having heaters mounted around them being used at one time. A well known heated nozzle is shown in the applicant's U.S. Pat. No. 4,355,460 which issued Oct. 26, 1982. In that case, an electrical heating element is wound in a space between an inner core portion and an outer casing and the space is then filled with highly conductive beryllium copper to surround the heating element and form an integral heated nozzle. While these work very well for most applications, they are relatively costly to make and the heating element is subject to malfunction. Furthermore, in some applications they do not have sufficient strength to withstand the repeated impact of the very high injection pressures required.

More recently, as seen in the applicant's U.S. Pat. No. 5,206,040 which issued Apr. 27, 1993, a nozzle or sealing element is shown without an electrical heating element. However, in this case the nozzle has the disadvantage that an elongated shaft or torpedo extending in its central bore is required to provide sufficient thermal conductivity.

SUMMARY OF THE INVENTION

Accordingly, it is an object of the present invention to at least partially overcome the disadvantages of the prior art by providing a nozzle having very high pressure strength which does not require a heating element.

To this end, in one of its aspects, the invention provides an integral injection molding nozzle with a front end and a rear end having an intermediate portion formed between an inner core portion and a surrounding concentric outer shell portion, the inner core portion having a melt bore extending centrally therethrough, the inner core portion and the outer shell portion being formed of at least one high strength material, the intermediate portion being formed of a highly thermally conductive material, having the improvement wherein at least one of the inner core portion and outer shell portions has a plurality of spaced vanes extending radially through the intermediate portion between the inner core portion and the outer shell portion.

Further objects and advantages of the invention will appear from the following description taken together with the accompanying drawings.

DETAILED DESCRIPTION OF THE INVENTION

Figure 1:
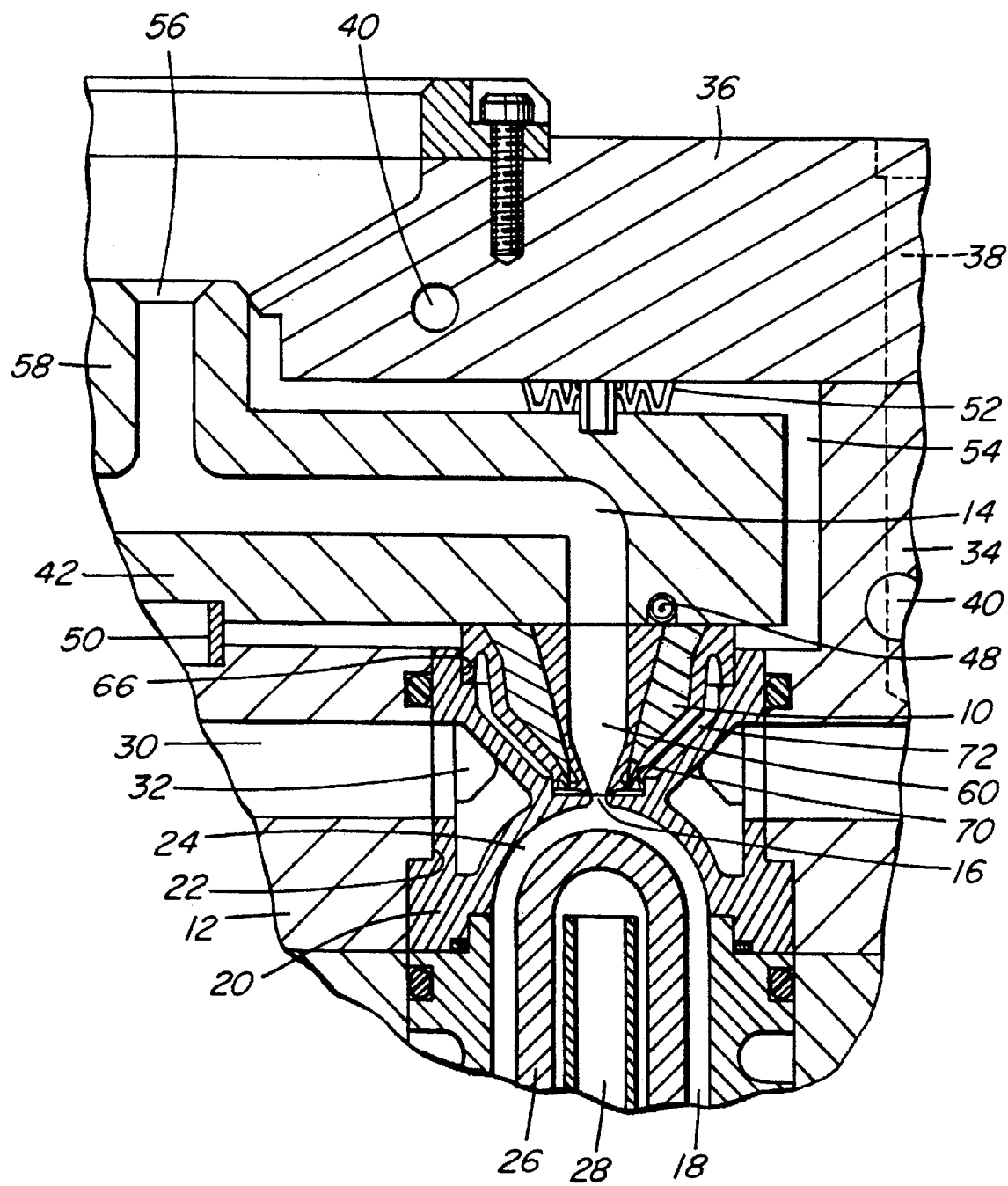
FIG. 1 is a sectional view of a portion of a multi-cavity injection molding system showing a nozzle according to a preferred embodiment of the invention.

Reference is first made to FIG. 1 which shows a portion of a multi-cavity injection molding system or apparatus in which several nozzles 10 according to the invention are seated in a mold 12 to convey pressurized plastic melt through a melt passage 14 to respective gates 16 leading to a cavities 18. In the particular configuration shown, each nozzle 10 is seated in a cooling insert 20 which is, in turn, seated in a generally cylindrical opening 22 in the mold 12. The cavity 18 has a convex portion 24 which is partially formed by the cooling insert 20 and is for molding PET preforms from which beverage bottles are made by stretch blow molding. The cavity 18 is also formed by a core insert 26 which is cooled by cooling water flowing in through a central bubbler tube 28. The cooling insert 20 is also cooled by pumping cooling water from conduits 30 through a circular ribbed cooling chamber 32.

While the mold 12 usually has a greater number of plates depending upon the configuration, in this case only a manifold retainer plate 34 and a back plate 36 which are secured together by bolts 38 are shown for ease of illustration. The mold 12 is also cooled by pumping cooling water through cooling conduits 40 in the manifold retainer plate 34 and back plate 36. The nozzles 10 are interconnected by a steel melt distribution manifold 42 which abuts against the rear ends 44 of the nozzles 10. The melt distribution manifold 42 has an integral electrical heating element 48 and is mounted between the manifold retainer plate 34 and the back plate 36 by a central locating ring 50 and insulative and resilient spacer members 52. This provides an insulative air space 54 between the melt distribution manifold 42 and the surrounding cooled manifold retainer plate 34 and back plate 36. The melt passage 14 receives melt through a central inlet 56 in a cylindrical inlet portion 58 of the manifold 42 and branches out in the manifold to pass through a central melt bore 60 in each of the nozzles 10. The melt then flows through the aligned gate 16 in the cooling insert 20 into each cavity 18.

Figure 2:
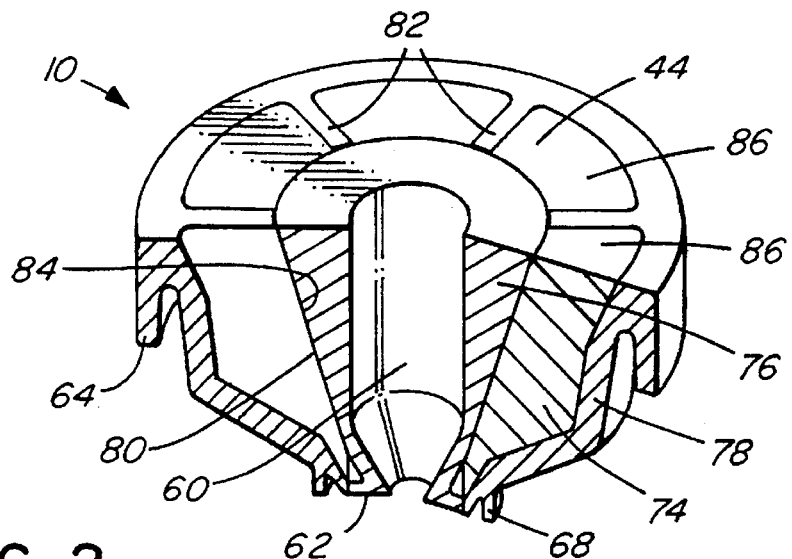
FIG. 2 is a partially cut-away isometric view of the nozzle seen in FIG. 1.

Referring also to FIG. 2, each nozzle 10 tapers inwardly from the flat circular rear end 44 to a smaller circular front end 62. A forwardly extending flange portion 64 near the rear end 44 sits in a circular seat 66 in the cooling insert 20, and the front end 62 has a small locating flange 68 which fits in a circular opening 70 in the cooling insert 20 around the gate 18. This accurately locates the nozzle 10 in the cooling insert 20, and provides an insulative air space 72 extending between them. As best seen in FIG. 2, the integral nozzle 10 has an intermediate portion 74 formed between an inner core portion 76 and an outer shell portion 78. The inner core portion 76 has the melt bore 60 extending centrally therethrough and an outer surface 80 which tapers inwardly towards the front end 62 of the nozzle 10. In this embodiment, the outer shell portion 78 has a number of spaced vanes 82 which extend radially inward into contact with the inner core portion 76. The vanes 82 have inner ends 84 which also taper inwardly towards the front end 62 of the nozzle 10 to match the shape of the outer surface 80 of the inner core portion 76. In this embodiment, the inner core portion 76 and the outer shell portion 78 are both made of H13 hot work tool steel. However, in other embodiments, one or both of them can be made of other suitable materials which have high tensile strength at elevated temperatures and have sufficient wear and corrosion resistance. On the other hand, the intermediate portion 74 is formed of copper or other suitable materials which is highly thermally conductive. The intermediate portion 74 consists of a number of copper segments 86 which are integrally formed between the radial vanes 82 by the method described below. The highly conductive intermediate portion 74 is in contact with the heated manifold 42 and transfers heat forwardly from it to provide sufficient heat in the area of the gate 16 and to ensure a relatively uniform temperature around the central melt bore 60 during the injection cycle. Thus, the combination of the two types of material with the radially extending vanes 82 provide a nozzle 10 which does not require a heating element and yet has sufficient strength to withstand the repeated pressurizing of the continuous molding cycle.

In use, after the system has been assembled as described above electrical power is applied to the heating element 48 to heat the manifold 42 and the nozzles 10 to a predetermined operating temperature. Pressurized melt from a molding machine (not shown) is then introduced according to a predetermined cycle into the central inlet 56 of the melt passage 14 of the manifold 42, from where it flows through the melt bore 60 of each nozzle 10 to fill the cavities 18. After the cavities 18 are full, injection pressure is held momentarily to pack and then released. After a short cooling period, the mold is opened to eject the product. After ejection, the mold is closed the injection pressure is reapplied to refill the cavity. This cycle is repeated in a continuous cycle with a frequency dependent on the size and shape of the cavities and the type of material being molded.

Figure 3:
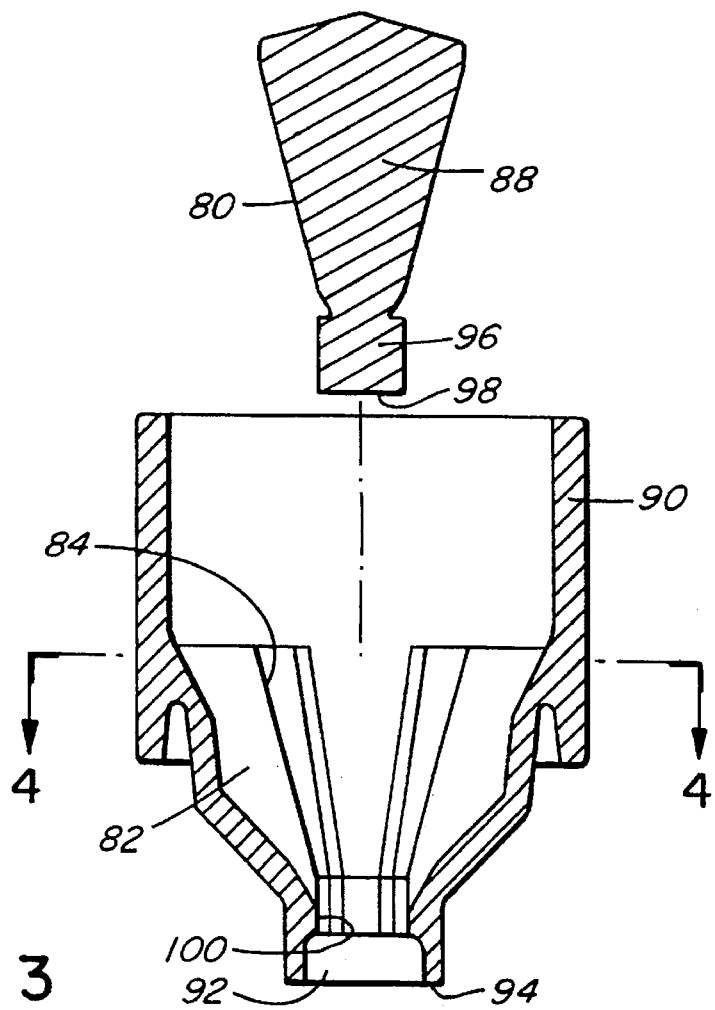
FIG. 3 is a sectional view showing an inner core in position to be inserted into an outer shell.
Figure 4:
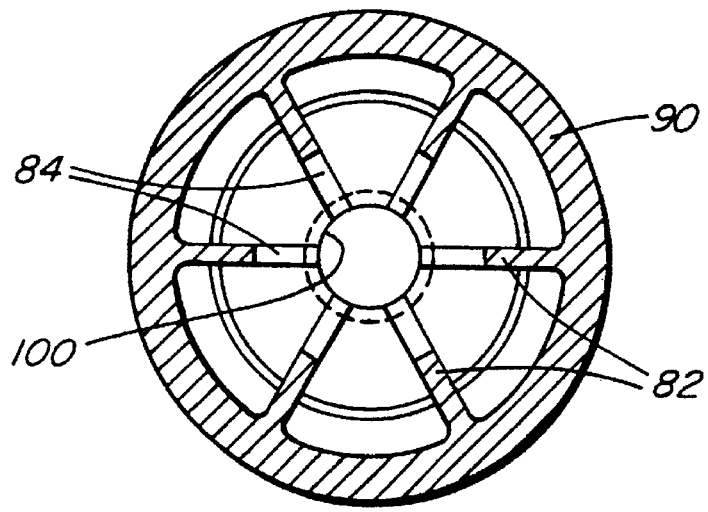
FIG. 4 is a cross-sectional view along line 4—4 in FIG. 3.

Reference is now made to FIGS. 3-6 in describing the method of making the integral nozzle 10. Firstly, inner cores 88 and outer shells 90 are made to the shape seen in FIG. 3. While the inner cores 88 are machined, the outer shell 90 is cast to have the radial vanes 82 described above and a recess 92 at the front end 94. As indicated in FIG. 3, the inner core 88 is inserted into the outer shell 90 with the inner ends 84 of the vanes 82 abutting against the outer surface 80 of the inner core 88. The inner core 88 has a cylindrical portion 96 at its front end 98 which fits through a narrow neck 100 in the outer shell 90. The cylindrical portion 96 of the inner core 88 extends into the recess 92 in the outer shell 90 to form a circular channel 102 between them.

Figure 5:
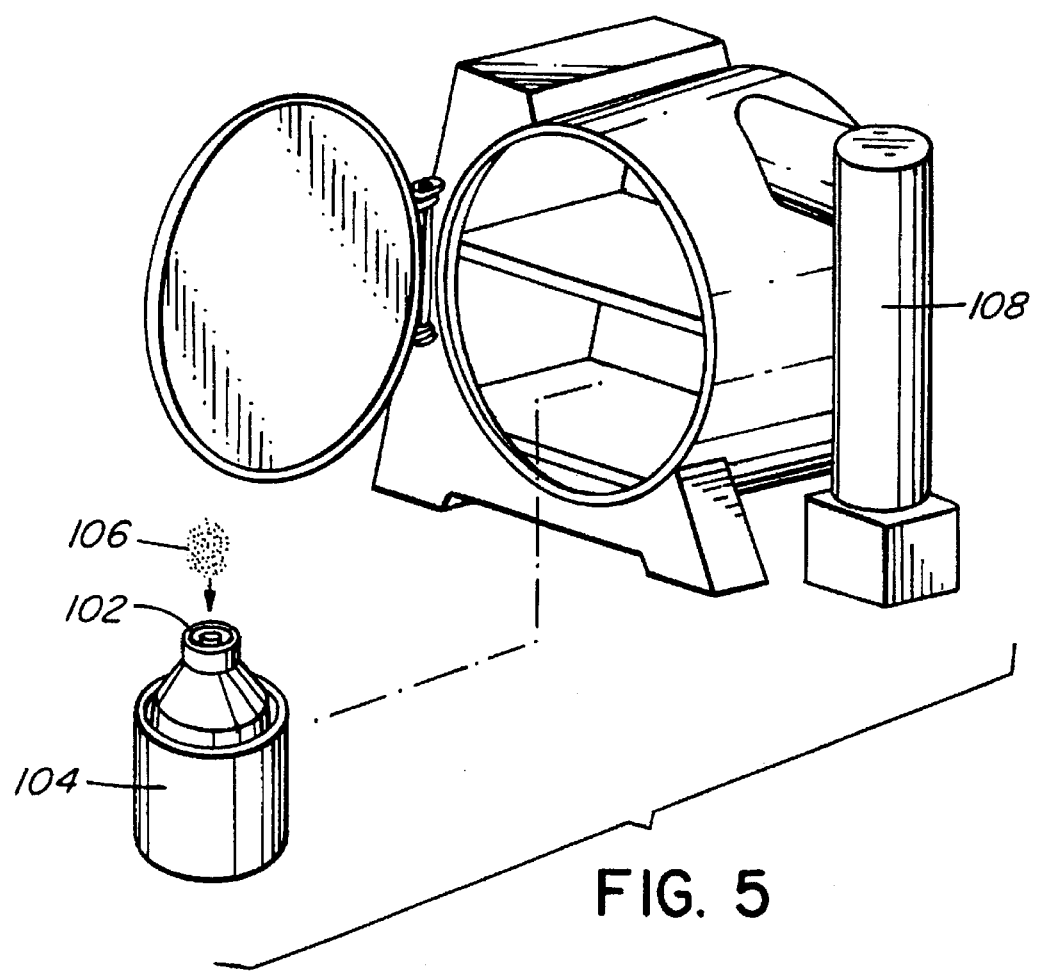
FIG. 5 is a view of the assembly with the inner core sealed in the outer shell in position to be inserted into a vacuum furnace.

As seen in FIG. 5, the assembly 104 is then positioned with the recess 92 facing up and a suitable brazing powder 106 such as a nickel alloy is poured into the channel 102. If desired, a bead (not shown) of brazing paste can be applied where the inner ends 84 of the vanes 82 contact the outer surface 80 of the inner core 88 to hold the inner core 88 and outer shell 90 together, but this is not necessary. The assemblies are then inserted in batches into a vacuum furnace 108 where they are heated during a controlled cycle. As the furnace 108 is gradually heated, it is evacuated to a relatively high vacuum to remove substantially all of the oxygen. The vacuum is then reduced by partially backfilling the furnace 108 with an inert gas such as argon or nitrogen to avoid spattering. The furnace 108 is heated to approximately 1950° F. which is above the melting point of the nickel alloy brazing material 106. This melts the brazing powder 106 which runs down and is brazed between the cylindrical portion 96 of the inner core 88 and the surrounding narrow neck 100 of the outer shell 90 to form a seal between them. This produces a type of diffusion braze with the steel which has a melting temperature even higher than the melting temperature of copper. The sealed assembly 104 is then removed from the furnace 108 and inverted to the position seen in FIG. 6. A slug of a highly conductive material such as copper 110 is then inserted into the mouth 112 formed at the rear end 114 of the outer shell 90. The assembly 104 is then reinserted into the vacuum furnace and reheated during a similar controlled cycle to a temperature of approximately 2035° F. which is sufficiently above the melting point of the copper conductive material 110 to melt it. When the copper melts, it flows down to fill the spaces between the radial vanes 82 of the outer shell 90 to form the segments 86 of the intermediate portion 76 of the nozzle 10. Casting the copper 110 in a partial vacuum provides a metallurgical bonding of the copper 110 to the steel of the inner core 88 and outer shell 90. Thus an integral structure is formed which efficiently transfers heat and has a high impact strength.

Figure 6:
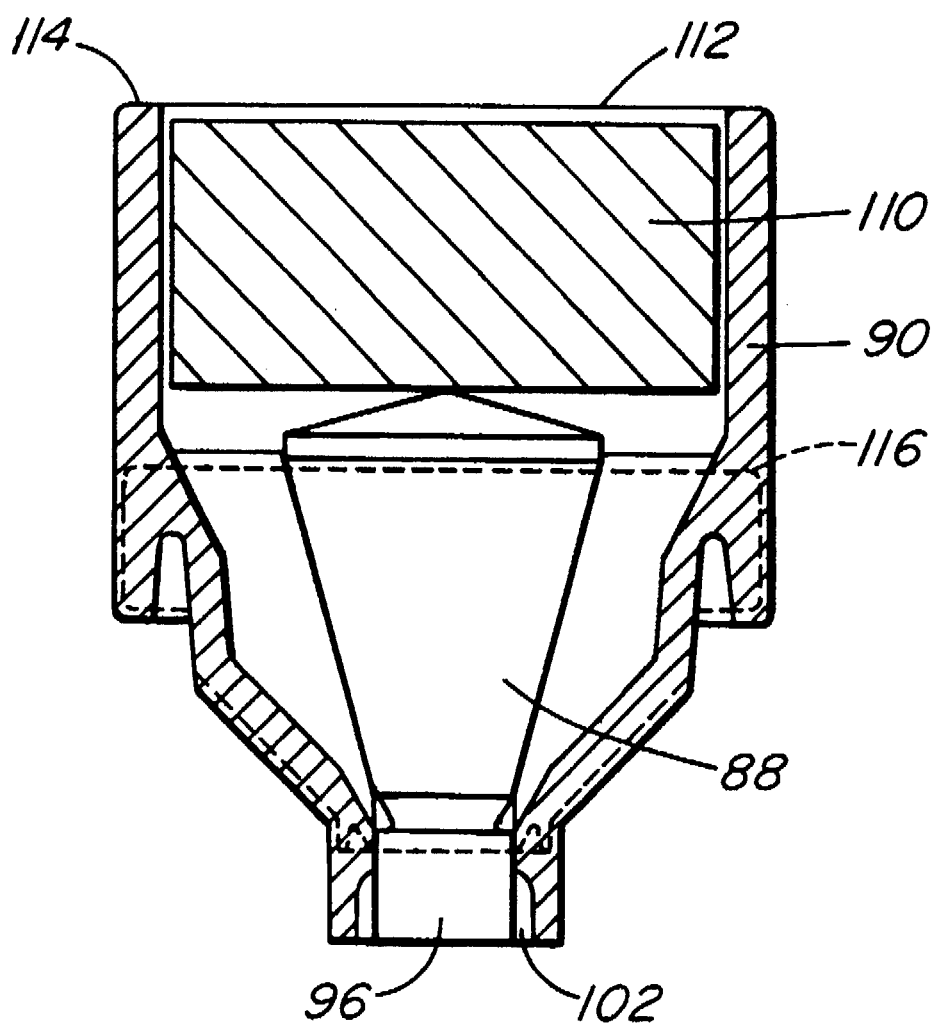
FIG. 6 is a sectional view showing a copper slug received in the assembly ready for reinsertion into the vacuum furnace.

Finally, after the assemblies 104 are removed from the vacuum furnace 108, they are machined to remove the excess material as shown by the dotted line 116 in FIG. 6 and to form the central bore 60 to provide completed nozzles as seen in FIG. 2.

While the description of the injection molding nozzle with radial vanes 82 extending through the highly conductive intermediate portion 74 has been given with respect to a preferred embodiment, it will be evident that various other modifications are possible without departing from the scope of the invention as understood by those skilled in the art and as defined in the following claims. In particular, in an alternate embodiment, the vanes 82 can be made as part of the inner core 88 and extend outwardly through the intermediate portion 74 into contact with the surrounding outer shell 90.

The embodiments of the invention in which an exclusive property or privilege is claimed is defined as follows:

1. In an integral injection molding nozzle with a front end, a rear end and an intermediate portion formed between an inner core portion and a surrounding concentric outer shell portion, the inner core portion having a melt bore extending centrally therethrough, the inner core portion and the outer shell portion being formed of at least one high strength material, the intermediate portion being formed of a highly thermally conductive material, the improvement wherein;

at least one of the inner core portion and outer shell portion has a plurality of vanes, said vanes being circumferentially spaced from each other, each vane extending from one of the inner core portion and the outer shell portion radially across the intermediate portion into contact with the other of the inner core portion and the outer shell portion.

2. An injection molding nozzle as claimed in claim 1 wherein the inner core portion has an outer surface which tapers inwardly towards the front end of the nozzle, and the vanes extend inwardly from the outer shell portion with inner ends which taper inwardly towards the front end of the nozzle into matching contact with the outer surface of the inner core portion.

3. An injection molding nozzle as claimed in claim 2 wherein the inner core portion and the outer shell portion are formed of steel.

4. An injection molding nozzle as claimed in claim 3 wherein the intermediate portion is formed of copper.

* * * * *